US012698242B2

(12) United States Patent (10) Patent No.: US 12,698,242 B2
Li et al. (45) Date of Patent: Aug. 4, 2026

(54) SAGGER FOR SINTERING LITHIUM COMPOSITE TRANSITION METAL OXIDE AND PREPARATION METHOD THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Bin Li, Guangdong (CN); Dingshan Ruan, Foshan (CN); Shenghe Tang, Foshan (CN); Ling Li, Foshan (CN); Xingyu Wu, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 525 days.

(21) Appl. No.: 18/210,097

(22) Filed: Jun. 15, 2023

(65) Prior Publication Data

US 2023/0322636 A1 Oct. 12, 2023

Related U.S. Application Data

(63) Continuation of application No. PCT/CN2021/123395, filed on Oct. 13, 2021.

(30) Foreign Application Priority Data

Dec. 15, 2020 (CN) .......................... 202011476844.5

(51) Int. Cl.
*C04B 41/89* (2006.01)
*C04B 35/64* (2006.01)

*C04B 35/80* (2006.01)
*C04B 41/00* (2006.01)
*C04B 41/45* (2006.01)
*C04B 41/50* (2006.01)
*C04B 41/52* (2006.01)
*F27D 5/00* (2006.01)

(52) U.S. Cl.
CPC .............. *C04B 41/89* (2013.01); *C04B 35/64* (2013.01); *C04B 35/80* (2013.01); *C04B 41/0072* (2013.01); *C04B 41/4539* (2013.01); *C04B 41/4543* (2013.01); *C04B 41/4578* (2013.01); *C04B 41/4596* (2013.01); *C04B 41/5024* (2013.01); *C04B 41/5027* (2013.01); *C04B 41/5059* (2013.01); *C04B 41/522* (2013.01); *C04B 41/524* (2013.01); *F27D 5/0012* (2013.01); *C04B 2235/3222* (2013.01); *C04B 2235/3248* (2013.01); *C04B 2235/3463* (2013.01); *C04B 2235/3826* (2013.01); *C04B 2235/5224* (2013.01); *C04B 2235/9669* (2013.01)

(58) Field of Classification Search
None
See application file for complete search history.

*Primary Examiner* — Jeffrey D Washville
(74) *Attorney, Agent, or Firm* — Westbridge IP LLC

(57) ABSTRACT

Disclosed are a sagger for sintering lithium composite transition metal oxide and a preparation method thereof. The sagger includes a substrate layer and a shallow layer on a surface of the substrate layer, and a coating layer. The substrate layer is prepared from the following raw materials: silicon carbide, magnesia-alumina spinel, aluminum oxide-magnesium oxide-yttrium oxide composite fiber, zircon powder and a binding agent; the shallow layer is prepared from the following raw materials: silicon carbide, magnesia-alumina spinel, aluminum oxide-titanium oxide composite fiber, yttrium oxide-zirconium oxide composite fiber and a binding agent; and the coating layer is prepared from the following raw materials: silicon carbide, magnesia-alumina spinel, magnesium oxide, zirconium oxide fiber, lithium composite transition metal oxide powder and a binding agent. The sagger of the present disclosure has properties of good corrosion resistance and a small coefficient of thermal expansion.

11 Claims, No Drawings

SAGGER FOR SINTERING LITHIUM COMPOSITE TRANSITION METAL OXIDE AND PREPARATION METHOD THEREOF

CROSS-REFERENCE TO RELATED APPLICATIONS

The present application is a continuation application of PCT application No. PCT/CN2021/123395 filed on Oct. 13, 2021, which claims the benefit of Chinese Patent Application No. 202011476844.5 filed on Dec. 15, 2020. The contents of all of the aforementioned applications are incorporated by reference herein in their entirety.

TECHNICAL FIELD

The present disclosure relates to the field of lithium composite transition metal oxide materials, and in particular to a sagger for sintering lithium composite transition metal oxide and a preparation method thereof.

BACKGROUND

Lithium composite transition metal oxide include lithium cobalt oxide, lithium nickel oxide, lithium manganese oxide, lithium iron phosphate, lithium nickel cobalt manganate, and so on, as well as their corresponding modified compounds. At present, lithium composite transition metal oxide materials used as cathode materials for lithium batteries are generally prepared through high-temperature solid-phase synthesis in the industry. The high temperature resistant saggers used in this synthesis process are generally that produced from cordierite, mullite, quartz, magnesia-alumina spinel, corundum, zircon, etc., among which cordierite, mullite, and magnesia-alumina spinel are more commonly used. However, in the process of synthesizing cathode materials, lithium oxide with strong permeation and reactivity will be generated. At high temperatures, alkaline lithium oxide reacts chemically with acidic substances and amphoteric oxides in a sagger, so that the sagger is corroded and a composite compound is formed which will cause corrosive phenomena, such as pulverization, cracking, peeling, slagging, and the like, on the sagger, thereby greatly reducing the service life of the sagger. In addition, the cathode materials will be contaminated due to the corrosive phenomena, which affects the quality of the cathode materials. With the development of lithium composite transition metal oxide materials toward high voltage and more and more common application of high temperature and high lithium ratio, higher requirements are put forward on the performance of saggers for sintering.

At present, the service life of domestic saggers is relatively short and the cost of imported saggers is relatively high. Therefore, how to increase the service life of saggers for sintering is of great significance.

In the prior art, a semi-formed sagger body is immersed in material liquid as a whole and then taken out after standing, or the material liquid is evenly sprayed on the surface of the semi-formed sagger body and then air-dried, the air-dried semi-formed sagger body is put in a calcining kiln for calcination at a temperature of 1400° C., which improves the corrosion resistance of the sagger. However, the resulting sagger only has improved corrosion resistance, and the thermal shock stability, strength, and thermal expansion coefficient of the sagger are not improved.

In the related prior art, a mixture of silica gel solution, acrylic emulsion, vinyl acetate, calcined $\alpha$-$Al_2O_3$ powder, light calcined magnesia powder, melted quartz powder, zircon powder, and so on, is mixed thoroughly and coated on the surface of the sagger, which can reduce corrosive phenomena, such as cracking, peeling, slaging, and the like. However, the corrosion resistance, thermal shock stability, strength, thermal expansion coefficient, etc. of the sagger have not been improved. At the same time, complicated organic compound formula is used and it is difficult to control the process stability.

Also in the related prior art, aluminium oxide is prepared from recycled sodium aluminate, and aluminium oxide is used to prepare repair materials for saggers with other raw materials such as SiC. The repaired sagger can have reduced slagging and increased number of use. However, the number of use of the SiC coating is often restricted. As the number of use continues to increase, the phenomenon of ring cracking will almost always occur, causing more cases of slagging defects. In addition, the thermal shock stability, strength, and thermal expansion coefficient of the sagger have not been improved.

SUMMARY

In order to solve the problems of poor strength, poor thermal shock resistance, susceptibility to erosion and easy peeling of a sagger, embodiments of the present disclosure provide a sagger for sintering lithium composite transition metal oxide and a preparation method thereof. The sagger prepared by the preparation method possesses good corrosion resistance and a small coefficient of thermal expansion, and is not easy to crack, peel and slag when contacted with cathode materials. In addition, the inner surface of the sagger is coated with another material, the operation process is relatively simple, and the use cost is reduced.

In order to achieve the aforementioned objective, embodiments of the present disclosure provide a sagger for sintering lithium composite transition metal oxide, which includes a substrate layer and a shallow layer on a surface of the substrate layer, and a coating layer; where the substrate layer is prepared from the following raw materials: silicon carbide, magnesia-alumina spinel, aluminum oxide-magnesium oxide-yttrium oxide composite fiber, zircon powder and a binding agent;

the shallow layer is prepared from the following raw materials: silicon carbide, magnesia-alumina spinel, aluminum oxide-titanium oxide composite fiber, yttrium oxide-zirconium oxide composite fiber and a binding agent; and the coating layer is prepared from the following raw materials: silicon carbide, magnesia-alumina spinel, magnesium oxide, zirconium oxide fiber, lithium composite transition metal oxide powder and a binding agent.

In some embodiments, silicon carbide is high-purity silicon carbide powder with a purity of ≥99%.

In some embodiments, the substrate layer is prepared from the following raw materials in parts by weight: 40-85 parts of silicon carbide, 2-10 parts of magnesia-alumina spinel, 5-15 parts of aluminum oxide-magnesium oxide-yttrium oxide composite fiber, 5-10 parts of zircon powder and 2-10 parts of the binding agent; the shallow layer is prepared from the following raw materials in parts by weight: 30-50 parts of silicon carbide, 10-30 parts of magnesia-alumina spinel, 5-20 parts of aluminum oxide-titanium oxide composite fiber, 5-20 parts of yttrium oxide-zirconium oxide composite fiber and 5-10 parts of the binding agent; and the coating layer is prepared from the following raw materials in parts by weight: 5-20 parts of silicon carbide, 5-20 parts of magnesia-alumina spinel, 6-10 parts of magnesium oxide, 3-10 parts of zirconium oxide fiber, 5-25 parts of lithium composite transition metal oxide powder and 10-20 parts of the binding agent.

In some embodiments, the magnesium oxide in the coating layer comprises magnesium oxide fiber and micro/nano magnesium oxide with a mass ratio of magnesium oxide fiber to micro/nano magnesium oxide of (3-10):(3-10), wherein the micro/nano magnesium oxide has a particle size of 10-500 nm.

In some embodiments, the binding agent is at least one selected from a group consisting of dextrin, polyvinyl alcohol, polyether modified polydimethylsilane, and silica alumina sol. In some other embodiments, the dextrin is yellow dextrin, and the polyvinyl alcohol is PVA-M with a concentration less than 5 wt. %.

In some embodiments, the lithium composite transition metal oxide powder is one or more selected from a group consisting of powders of lithium cobalt oxide, lithium manganese oxide, lithium nickel oxide and lithium nickel-cobalt manganate. In some other embodiments, lithium cobalt oxide is modified by doping and/or coating, the element doped is at least one selected from a group consisting of Mg, Al, Ti, Zr, Ni, Mn, La, Y, Si, and W; the element coated is at least one selected from a group consisting of Mg, Al, Ti, Zr, Ni, Mn, La, Y, Si, and W; and the particle size of the lithium composite transition metal oxide powder is in micrometer level, and in some other embodiments, the particle size of the lithium composite transition metal oxide powder is in a range of 0.5-5 μm.

In some embodiments, the aluminum oxide-magnesium oxide-yttrium oxide composite fiber is prepared through stirring and compounding aluminum oxide fiber, magnesium oxide fiber and yttrium oxide fiber at 50-100° C.; the aluminum oxide-titanium oxide composite fiber is prepared through stirring and compounding aluminum oxide fiber and titanium oxide fiber at 50-200° C.; and the yttrium oxide-zirconium oxide composite fiber is prepared through stirring and compounding yttrium oxide fiber and zirconium oxide fiber at 100-200° C.

The embodiments of the present disclosure provide a preparation method of a sagger for sintering lithium composite transition metal oxide, which comprises steps of:

Step (1): mixing and slurrying raw materials of a substrate layer to make a first slurry, and subjecting the first slurry to staling treatment and compression moulding to obtain a primary green body;

Step (2): mixing and slurrying raw materials of a shallow layer to make a second slurry, coating the second slurry on a surface of the primary green body, and then subjecting the primary green body coated with the second slurry to compression moulding again to obtain a green body;

Step (3): subjecting the green body to drying and sintering to obtain an intermediate sagger; and Step (4): mixing and slurrying raw materials of a coating layer into a third slurry to obtain a coating agent, spraying the coating agent on an inner surface of the intermediate sagger, and then performing micro-fire treatment to obtain a finished sagger.

The spraying specifically comprises: repeatedly spraying the coating agent uniformly on the inner surface of the intermediate sagger with a spray gun several times to make the coating agent as uniform as possible without dripping, convex marks, and so on, so as to prevent the coating layer from cracking during use.

In some embodiments, water is used as a medium when the raw materials of the substrate layer, the shallow layer and the coating layer are mixed and slurried; wherein, water is used in the substrate layer in an amount of 4%-10% of total mass of the raw materials of the substrate, water is used in the shallow layer in an amount of 4%-10% of total mass of the raw materials of the shallow layer; and water is used in the coating layer in an amount of 50%-80% of total mass of the raw materials of the coating layer.

In some embodiments, the binding agent is used in the shallow layer in an amount of 4%-6% of total mass of the raw material of the shallow layer, and the binding agent is used in the coating layer in an amount of 12%-20% of total mass of the raw material of the coating layer.

In some embodiments, in step (1), the staling treatment is carried out for 10-24 hours.

In some embodiments, in step (2), the second slurry may be uniformly distributed on the surface of the primary green body by a distributor or manually.

In some embodiments, in step (3), the drying means firstly drying the green body in shade under normal temperature and ventilation conditions for 15-30 hours, and then baking the green body at a certain temperature.

In some embodiments, in step (3), the sintering is carried out for 2 to 5 hours at a temperature of 1320° C.-2000° C. in a vacuum or inert atmosphere.

In some embodiments, in step (4), a procedure of repeatedly performing spraying and micro-fire treatment is further comprised after the micro-fire treatment, and the spraying and micro-fire treatment is performed at least 2 times.

In some embodiments, in step (4), the micro-fire treatment is carried out for 5-180 min at a temperature in a range from 50° C. to 200° C.

Beneficial Effects:

1. The substrate layer is composed of silicon carbide and a variety of fiber composite oxides, which overcomes the shortcoming of poor strength of the sagger and improves the overall strength of the sagger. Besides, silicon carbide has the characteristics of strong heat radiation ability, which reduces energy consumption to a certain extent, so that the sagger is heated more evenly and it is easier to eliminate stress.

2. The fibers in the substrate layer and the shallow layer, i.e., aluminum oxide-magnesium oxide-yttrium oxide composite fiber, aluminum oxide-titanium oxide composite fiber, and yttrium oxide-zirconium oxide composite fiber, have excellent corrosion resistance, and improve the corrosion resistance of the sagger to a certain extent. Besides, magnesium oxide is easy to diffuse, so that the structural stability of the substrate layer, the shallow layer and the coating layer is improved.

3. The addition of oxide fibers which are easy to diffuse and micron-level lithium composite transition metal oxide powder in the coating layer renders the coating layer has partly similar composition to the lithium composite transition metal oxide, which, on one hand, improves the corrosion resistance of the surface of the sagger, prevents the surface from peeling and improves the service life of the sagger, and on the other hand, greatly improves the purity and qualification rate of the lithium composite transition metal oxide.

4. The shallow layer and the coating layer have increasing similarity in composition to the lithium composite transition metal oxide from the shallow layer to the coating layer, which greatly reduces the reaction between the sagger and the transition metal oxide, inhibits corrosion phenomena of the surface, such as cracking, peeling, slagging, and so on, and improves the corrosion resistance of the sagger.

5. The whole structure is toughened through transformation toughening and fiber toughening, the fiber substances form a large number of complex oxides with three-dimensional network structure in the sagger, which can better connect the substrate layer, the shallow layer and the coating layer. The addition of the fiber substances also restrains the surface from falling off to a certain extent, thereby greatly improving the service life of the sagger.

6. The preparation method of the embodiments of the present disclosure has properties of simple process operation, low production cost and high production efficiency; and the coating amount and thickness of the coating layer are controllable. Different from a sagger which is prepared through performing surface treatment on a sintered product according to the traditional process, the intermediate fiber layer is present in the sagger of the present disclosure, which is beneficial to overall separation of the coating layer, the substrate layer and the shallow layer, so that the substrate layer can be recycled, thereby reducing discharge of solid wastes and improving production efficiency of manufacturers.

DETAILED DESCRIPTION

In order to provide thorough understanding of the present disclosure, the preferred embodiments will be described below in conjunction with examples to further illustrate the features and advantages of the present disclosure. Any variations or modifications that do not deviate from the concept of the present disclosure can be understood by those skilled in the art, and the scope of protection of the present disclosure is determined by the scope of the claims.

Example 1

A preparation method of a sagger for sintering lithium composite transition metal oxide comprises steps of:

(1) Based on 100 parts by weight of total raw materials of a substrate layer, preparing 70 parts of high-purity silicon carbide powder, 5 parts of magnesia-aluminum spinel, 10 parts of aluminum oxide-magnesium oxide-yttrium oxide composite fiber and 5 parts of zircon powder, and then preparing silica-alumina sol as a binding agent in an amount of 10% of the total mass of the raw materials of the substrate layer;

(2) Mixing and slurrying the raw materials of the substrate layer in step (1) with deionized water as medium in an amount of 6% of the total mass of the raw materials of the substrate layer to obtain a first slurry, thoroughly stirring the first slurry and staling for 15 hours, and then subjecting the staled first slurry to compression moulding by moulding equipment to obtain a primary green body;

(3) Based on 100 parts by weight of total raw materials of a shallow layer, preparing 50 parts of high-purity silicon carbide powder, 20 parts of magnesia-aluminum spinel, 15 parts of aluminum oxide-titanium oxide composite fiber, and 10 parts of yttrium oxide-zirconium oxide composite fiber, and then preparing silica-alumina sol as the binding agent in an amount of 5% of the total mass of the raw materials of the shallow layer;

(4) Mixing and slurrying the raw materials of the shallow layer in step (3) with deionized water as medium in an amount of 5% of the total mass of the raw materials of the shallow layer to obtain a second slurry, thoroughly stirring the second slurry and coating it uniformly on a surface of the primary green body to a required thickness, then subjecting the primary green body coated the second slurry to compression moulding by moulding equipment again to obtain a green body, drying the green body at normal temperature prior to baking it, followed by sintering it at 1350° C. for 3 hours to obtain an intermediate sagger;

(5) Based on 100 parts by weight of total raw materials of a coating layer, preparing 20 parts of high-purity silicon carbide powder, 10 parts of magnesia-alumina spinel, 10 parts of magnesium oxide fiber, 10 parts of zirconium oxide fiber, 10 parts of micro/nano magnesium oxide, and 20 parts of micron-grade modified lithium cobalt oxide powder, and then preparing silica-alumina sol as the binding agent in an amount of 20% of the total mass of the raw materials of the coating layer; and (6) Mixing and slurrying the raw materials of the coating layer in step (5) with deionized water as medium in an amount of 60% of the total mass of the raw materials of the coating layer to obtain a third slurry, thoroughly stirring the third slurry to obtain a coating agent, spraying the coating agent uniformly on an inner surface of the intermediate sagger, performing micro-fire treatment for 10 minutes at 80° C. followed by second spraying, and then performing second micro-fire treatment for 20 minutes at 50° C. to finally obtain a finished sagger.

Example 2

A preparation method of a sagger for sintering lithium composite transition metal oxide comprises steps of:

(1) Based on 100 parts by weight of total raw materials of a substrate layer, preparing 65 parts of high-purity silicon carbide powder, 10 parts of magnesia-aluminum spinel, 15 parts of aluminum oxide-magnesium oxide-yttrium oxide composite fiber and 5 parts of zircon powder, and then preparing silica-alumina sol as a binding agent in an amount of 5% of the total mass of the raw materials of the substrate layer;

(2) Mixing and slurrying the raw materials of the substrate layer in step (1) with deionized water as medium in an amount of 10% of the total mass of the raw materials of the substrate layer to obtain a first slurry, thoroughly stirring the first slurry and staling for 15 hours, and then subjecting the staled first slurry to compression moulding by moulding equipment to obtain a primary green body;

(3) Based on 100 parts by weight of total raw materials of a shallow layer, preparing 40 parts of high-purity silicon carbide powder, 20 parts of magnesia-aluminum spinel, 20 parts of aluminum oxide-titanium oxide composite fiber, and 10 parts of yttrium oxide-zirconium oxide composite fiber, and then preparing silica-alumina sol as the binding agent in an amount of 10% of the total mass of the raw materials of the shallow layer;

(4) Mixing and slurrying the raw materials of the shallow layer in step (3) with deionized water as medium in an amount of 10% of the total mass of the raw materials of the shallow layer to obtain a second slurry, thoroughly stirring the second slurry and coating it uniformly on a surface of the primary green body to a required thickness, then subjecting the primary green body coated the second slurry to compression moulding by moulding equipment again to obtain a green body, drying the green body at normal temperature prior to baking it, followed by sintering it at 1350° C. for 4 hours to obtain an intermediate sagger;

(5) Based on 100 parts by weight of total raw materials of a coating layer, preparing 20 parts of high-purity silicon carbide powder, 20 parts of magnesia-alumina spinel, 5 parts of magnesium oxide fiber, 10 parts of zirconium oxide fiber, 5 parts of micro/nano magnesium oxide, and 25 parts of micron-grade modified lithium cobalt oxide powder, and then preparing silica-alumina sol as the binding agent in an amount of 15% of the total mass of the raw materials of the coating layer; and (6) Mixing and slurrying the raw materials of the coating layer in step (5) with deionized water as medium in an amount of 70% of the total mass of the raw materials of the coating layer to obtain a third slurry, thoroughly stirring the third slurry to obtain a coating agent, spraying the coating agent uniformly on an inner surface of the intermediate sagger, performing micro-fire treatment for 10 minutes at 80° C. followed by second spraying, and then performing second micro-fire treatment for 20 minutes at 50° C. to finally obtain a finished sagger.

Example 3

The steps of Example 3 are basically the same as those of Example 1, except that the binding agent used in Example 3 is polyether-modified polydimethylsilane.

Example 4

The steps of Example 4 are basically the same as those of Example 1, except that the binding agent used in Example 4 is PVA-M.

Example 5

The steps of Example 5 are basically the same as those of Example 1, except that the micron-level modified lithium cobalt oxide powder in step (5) of Example 5 is replaced with micron-level lithium nickel cobalt manganese oxide.

Comparative Example 1

The steps of Comparative Example 1 are basically the same as those of Example 1, except that only steps (1) to (2) of Example 1 are performed and then the obtained primary green body is directly sintered into a sagger in Comparative Example 1.

Comparative Example 2

The steps of Comparative Example 2 are basically the same as those of Example 1, except that only steps (1) to (4) of Example 1 are performed and then the obtained green body is directly sintered into a sagger in Comparative Example 2.

Comparative Example 3

The steps of Comparative Example 3 are basically the same as those of Example 1, except that micron-level modified lithium cobalt oxide powder is not added into the coating layer in step (5) of Comparative Example 3.

Comparative Example 4

The steps of Comparative Example 4 are basically the same as those of Example 1, except that oxide fibers are not added into the coating layer in step (5) of Comparative Example 4.

Comparative Example 5

The steps of Comparative Example 5 are basically the same as those of Example 1, except that composite fibers are not added into the shallow layer in step (3) of Comparative Example 5.

Comparative Example 6

The steps of Comparative Example 6 are basically the same as those of Example 1, except that only steps (1), (2), (5) and (6) of Example 1 are performed in Comparative Example 6.

Comparative Example 7

The steps of Comparative Example 5 are basically the same as those of Example 1, except that no binding agent is used in Comparative Example 7.

Table 1 shows service life test results of the saggers prepared in Examples 1 to 2 and Comparative Examples 1 to 6, with 8 saggers randomly selected from each example, as shown below:

TABLE 1

| | Number of saggers | Used for 15 times | Number of scrapped saggers | Scrap reason |
|---|---|---|---|---|
| Example 1 | 8 | 8 | 0 | No |
| Example 2 | 8 | 8 | 0 | No |
| Comparative Example 1 | 8 | 0 | 8 | Corroded, peeled, slagged, cracked, bottom sticked |
| Comparative Example 2 | 8 | 2 | 6 | Corroded, bottom sticked |
| Comparative Example 3 | 8 | 3 | 5 | Peeled, slagged, contaminated surface |
| Comparative Example 4 | 8 | 4 | 4 | Cracked |
| Comparative Example 5 | 8 | 0 | 8 | Peeled, slagged |
| Comparative Example 6 | 8 | 0 | 8 | cracked |

It can be seen from Table 1 that none of the 8 saggers prepared in Example 1 or Example 2 is scrapped after used for 15 times, which indicates that a sagger, prepared from a substrate layer comprising high-purity silicon carbide powder, magnesia-alumina spinel, aluminum oxide-magnesium oxide-yttrium oxide composite fiber, zircon powder, and silica-alumina sol and water, a shallow layer comprising high-purity silicon carbide powder, magnesia-aluminum spinel, aluminum oxide-titanium oxide composite fiber, yttrium oxide-zirconium oxide composite fiber, and silica-alumina and water, and a coating layer comprising high-purity silicon carbide powder, magnesia-alumina spinel, magnesium oxide fiber, zirconium oxide fiber, micro/nano magnesium oxide, micron-grade modified lithium cobalt oxide powder, and silica-alumina sol and water, which function together, has properties of good thermal shock stability, strong corrosion resistance, and high strength, which are reflected in more number of uses of the sagger. In Comparative Example 1, the primary green body is directly sintered to make a sagger, however, a series of phenomena such as peeling, slagging, cracking, and sticking occur on the sagger during use. In Comparative Example 2, the inner layer of the sagger is easy to be corroded by materials due to the lack of the coating layer, and sticking occurs, which makes part of the saggers have reduced service life. In Comparative Example 3, lack of micron-level modified lithium cobalt oxide powder makes the surface easy to be contaminated and peeling and slagging occur. After the saggers of Comparative Example 4 are used for 15 times, 4 saggers are scrapped due to cracking, since the coating layer lacks oxide fibers and the structural stability is reduced. None of the saggers in Comparative Examples 5 and 6 can be used for 15 times, this is because that no oxide fiber is added and the saggers have weakened thermal shock resistance and corrosion resistance, so that a series of phenomena such as peeling, slagging and cracking occur.

Table 2 shows service life test results of the saggers prepared in Examples 3 to 5 and Comparative Example 7, with 8 saggers randomly selected from each example, as shown below:

TABLE 2

| | Number of saggers | Used for 15 times | Number of scrapped saggers | Scrap reason |
|---|---|---|---|---|
| Example 3 | 8 | 7 | 1 | Bottom sticked |
| Example 4 | 8 | 8 | 0 | No |
| Example 5 | 8 | 8 | 0 | No |
| Comparative Example 7 | 8 | 0 | 8 | Corroded, peeled, slagged, cracked, bottom sticked |

It can be seen from Table 2 that different binding agents have little effect on the service life of the saggers. In Example 3, only one sagger is scrapped due to bottom sticked. In Comparative Example 7, the saggers without a binding agent show a series of phenomena of corrosion, slagging, cracking and sticking.

Table 3 shows mass changes of raw materials of lithium composite transition metal oxide in the saggers of Example 1 and Comparative Examples 1 and 2 before and after being sintered in a furnace.

TABLE 3

| Sagger | Experiment No. | Mass before being sintered in furnace (kg) | Theoretic mass (kg) | Real mass (kg) | Difference (real mass − theorietic mass) (kg) |
|---|---|---|---|---|---|
| Example 1 | A-01 | 5.0 | 4.215 | 4.219 | 0.004 |
| | A-02 | 5.0 | 4.215 | 4.217 | 0.002 |
| | A-03 | 5.0 | 4.215 | 4.220 | 0.005 |
| | Mean | | | | 0.0037 |
| Comparative Example 1 | B-01 | 5.0 | 4.215 | 4.242 | 0.027 |
| | B-02 | 5.0 | 4.215 | 4.238 | 0.023 |
| | B-03 | 5.0 | 4.215 | 4.237 | 0.022 |
| | Mean | | | | 0.024 |
| Comparative Example 2 | C-01 | 5.0 | 4.215 | 4.223 | 0.008 |
| | C-02 | 5.0 | 4.215 | 4.226 | 0.011 |
| | C-03 | 5.0 | 4.215 | 4.227 | 0.012 |
| | Mean | | | | 0.0103 |

It can be seen from Table 3 that the mass changes of raw materials of lithium composite transition metal oxide in the saggers in Example 1 before and after being sintered are relative small, with a mean of 0.0037 kg, indicating that the saggers have less corrosion by the raw materials of lithium composite transition metal oxide. In addition, less substances in the saggers come into lithium composite transition metal oxide, and lithium composite transition metal oxide are contaminated less, thereby increasing the service life of the saggers. In Comparative Example 1, the mass of the raw materials of lithium composite transition metal oxide in the saggers is increased by 0.024 kg on average, indicating that the phenomena of peeling, slagging and corrosion occur on the saggers of Comparative Example 1 so that the substances in the saggers come into lithium composite transition metal oxide and contaminate lithium composite transition metal oxide, so that the composition of the saggers is changed and the service life of the saggers is shortened. In Comparative Example 2, the mass of the raw materials of lithium composite transition metal oxide in the saggers is increased by 0.0103 kg on average, which indicates that a small amount of the substances in the saggers come into lithium composite transition metal oxide and contaminate lithium composite transition metal oxide, so that the service life of the saggers in Comparative Example 2 takes second place.

The sagger for sintering lithium composite transition metal oxide and a preparation method thereof provided by the present disclosure have been described in detail above. Specific examples are used herein to illustrate the principles and implementation of the present disclosure. The above description of examples is only for the purpose of helping understand methods and core concepts of the present disclosure, including best modes, and also enables any person skilled in the art to practice the present disclosure, including manufacture and use of any device or system, and implementation of any combined methods. It should be noted that several improvements and modifications can be made by those skilled in the art to the present disclosure without departing from the principles of the present disclosure, which improvements and modifications also fall within the protection scope claimed by the claims. The protection scope of the present disclosure is defined by the claims and may include other embodiments that can be thought of by those skilled in the art. If these other embodiments have structural elements that are not different from the literal expression of the claims, or if they include equivalent structural elements that are not substantially different from the literal expression of the claims, these other embodiments should also be included within the scope of the claims.

The invention claimed is:

1. A sagger for sintering lithium composite transition metal oxide, wherein the sagger includes a substrate layer and a shallow layer on a surface of the substrate layer, and a coating layer;

the substrate layer is prepared from the following raw materials: silicon carbide, magnesia-alumina spinel, aluminum oxide-magnesium oxide-yttrium oxide composite fiber, zircon powder and a binding agent;

the shallow layer is prepared from the following raw materials: silicon carbide, magnesia-alumina spinel, aluminum oxide-titanium oxide composite fiber, yttrium oxide-zirconium oxide composite fiber and a binding agent; and the coating layer is prepared from the following raw materials: silicon carbide, magnesia-alumina spinel, magnesium oxide, zirconium oxide fiber, lithium composite transition metal oxide powder and a binding agent; wherein, the substrate layer is prepared from the following raw materials in parts by weight: 40-85 parts of silicon carbide, 2-10 parts of magnesia-alumina spinel, 5-15 parts of aluminum oxide-magnesium oxide-yttrium oxide composite fiber, 5-10 parts of zircon powder and 2-10 parts of the binding agent; the shallow layer is prepared from the following raw materials in parts by weight: 30-50 parts of silicon carbide, 10-30 parts of magnesia-alumina spinel, 5-20 parts of aluminum oxide-titanium oxide composite fiber, 5-20 parts of yttrium oxide-zirconium oxide composite fiber and 5-10 parts of the binding agent; and the coating layer is prepared from the following raw materials in parts by weight: 5-20 parts of silicon carbide, 5-20 parts of magnesia-alumina spinel, 6-10 parts of magnesium oxide, 3-10 parts of zirconium oxide fiber, 5-25 parts of lithium composite transition metal oxide powder and 10-20 parts of the binding agent; and the binding agent is at least one selected from a group consisting of dextrin, polyvinyl alcohol, polyether modified polydimethylsilane, and silica alumina sol.

2. The sagger of claim 1, wherein the magnesium oxide in the coating layer comprises magnesium oxide fiber and micro/nano magnesium oxide with a mass ratio of magnesium oxide fiber to micro/nano magnesium oxide of (3-10): (3-10).

3. The sagger of claim 1, wherein the lithium composite transition metal oxide powder is one or more selected from a group consisting of powders of lithium cobalt oxide, lithium manganese oxide, lithium nickel oxide and lithium nickel-cobalt manganate.

4. The sagger of claim 1, wherein the aluminum oxide-magnesium oxide-yttrium oxide composite fiber is prepared through stirring and compounding aluminum oxide fiber, magnesium oxide fiber and yttrium oxide fiber at 50° C.-100° C.; the aluminum oxide-titanium oxide composite fiber is prepared through stirring and compounding aluminum oxide fiber and titanium oxide fiber at 50° C.-200° C.; and the yttrium oxide-zirconium oxide composite fiber is prepared through stirring and compounding yttrium oxide fiber and zirconium oxide fiber at 100° C.-200° C.

5. A preparation method of the sagger of claim 1, wherein the preparation method comprises steps of:
  step (1): mixing and slurrying raw materials of a substrate layer to obtain a first slurry, and subjecting the first slurry to staling treatment and compression moulding to obtain a primary green body;
  step (2): mixing and slurrying raw materials of a shallow layer to obtain a second slurry, coating the second slurry on a surface of the primary green body, and then subjecting the primary green body coated with the second slurry to compression moulding again to obtain a green body;
  step (3): subjecting the green body to drying and sintering to obtain an intermediate sagger; and
  step (4): mixing and slurrying raw materials of a coating layer into a third slurry to obtain a coating agent, spraying the coating agent on an inner surface of the intermediate sagger, and then performing micro-fire treatment to obtain a finished sagger.

6. A preparation method of the sagger of claim 2, wherein the preparation method comprises steps of:
  step (1): mixing and slurrying raw materials of a substrate layer to obtain a first slurry, and subjecting the first slurry to staling treatment and compression moulding to obtain a primary green body;
  step (2): mixing and slurrying raw materials of a shallow layer to obtain a second slurry, coating the second slurry on a surface of the primary green body, and then subjecting the primary green body coated with the second slurry to compression moulding again to obtain a green body;
  step (3): subjecting the green body to drying and sintering to obtain an intermediate sagger; and
  step (4): mixing and slurrying raw materials of a coating layer into a third slurry to obtain a coating agent, spraying the coating agent on an inner surface of the intermediate sagger, and then performing micro-fire treatment to obtain a finished sagger.

7. A preparation method of the sagger of claim 3, wherein the preparation method comprises steps of:
  step (1): mixing and slurrying raw materials of a substrate layer to obtain a first slurry, and subjecting the first slurry to staling treatment and compression moulding to obtain a primary green body;
  step (2): mixing and slurrying raw materials of a shallow layer to obtain a second slurry, coating the second slurry on a surface of the primary green body, and then subjecting the primary green body coated with the second slurry to compression moulding again to obtain a green body;
  step (3): subjecting the green body to drying and sintering to obtain an intermediate sagger; and
  step (4): mixing and slurrying raw materials of a coating layer into a third slurry to obtain a coating agent, spraying the coating agent on an inner surface of the intermediate sagger, and then performing micro-fire treatment to obtain a finished sagger.

8. A preparation method of the sagger of claim 4, wherein the preparation method comprises steps of:
  step (1): mixing and slurrying raw materials of a substrate layer to obtain a first slurry, and subjecting the first slurry to staling treatment and compression moulding to obtain a primary green body;
  step (2): mixing and slurrying raw materials of a shallow layer to obtain a second slurry, coating the second slurry on a surface of the primary green body, and then subjecting the primary green body coated with the second slurry to compression moulding again to obtain a green body;
  step (3): subjecting the green body to drying and sintering to obtain an intermediate sagger; and
  step (4): mixing and slurrying raw materials of a coating layer into a third slurry to obtain a coating agent, spraying the coating agent on an inner surface of the intermediate sagger, and then performing micro-fire treatment to obtain a finished sagger.

9. The preparation method of claim 5, wherein water is used as a medium when the raw materials of the substrate layer, the shallow layer and the coating layer are mixed and slurried; water is used in the substrate layer in an amount of 4%-10% of total mass of the raw materials of the substrate, water is used in the shallow layer in an amount of 4%-10% of total mass of the raw materials of the shallow layer; and water is used in the coating layer in an amount of 50%-80% of total mass of the raw materials of the coating layer.

10. The preparation method of claim 5, wherein the binding agent is used in the shallow layer in an amount of 4%-6% of total mass of the raw material of the shallow layer, and the binding agent is used in the coating layer in an amount of 12%-20% of total mass of the raw material of the coating layer.

11. The preparation method of claim 5, wherein in step (4), a procedure of repeatedly performing spraying and micro-fire treatment is further comprised after the micro-fire treatment, and the spraying and micro-fire treatment is performed at least 2 times.

* * * * *